(12) United States Patent
Sasaki

(10) Patent No.: US 6,293,089 B1
(45) Date of Patent: Sep. 25, 2001

(54) GAS TURBINE

(75) Inventor: Takashi Sasaki, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/655,391

(22) Filed: Sep. 5, 2000

Related U.S. Application Data

(62) Division of application No. 09/124,977, filed on Jul. 30, 1998.

(30) Foreign Application Priority Data

Jul. 31, 1997 (JP) .................................................... 9-206631

(51) Int. Cl.⁷ .................................................... F04C 3/04
(52) U.S. Cl. .................... 60/39.75; 415/174.5; 416/96 R
(58) Field of Search ............................. 60/39.75; 416/95, 416/96 R; 415/116, 174.5, 229

(56) References Cited

U.S. PATENT DOCUMENTS

| | | |
|---|---|---|
| 2,173,489 | 9/1939 | Voigt . |
| 2,759,700 * | 8/1956 | Wheatley ............................. 415/115 |
| 2,860,851 | 11/1958 | Halford et al. . |
| 2,893,703 | 7/1959 | Richardson . |
| 3,556,676 | 1/1971 | Gorbunov et al. . |
| 4,137,705 * | 2/1979 | Andersen et al. ............... 60/39.75 X |
| 4,507,914 * | 4/1985 | Rice ..................................... 60/39.17 |
| 5,054,583 | 10/1991 | Wrzyszczynski . |
| 5,134,844 * | 8/1992 | Lee et al. ............................ 415/116 |
| 5,564,896 * | 10/1996 | Beeck et al. ......................... 415/175 |
| 5,695,319 * | 12/1997 | Matsumoto et al. ..................... 416/95 |
| 5,795,130 * | 8/1998 | Suenaga et al. ....................... 416/95 |
| 6,019,573 * | 2/2000 | Uematsu et al. .................. 415/116 X |
| 6,053,701 * | 4/2000 | Ichiryu et al. ..................... 406/96 R |
| 6,094,905 * | 8/2000 | Fukuyama ............................ 60/39.75 |
| 6,146,090 * | 11/2000 | Schmidt .......................... 416/96 R X |

FOREIGN PATENT DOCUMENTS

| | | |
|---|---|---|
| 322 772 | 8/1957 | (CH) . |
| 574 739 | 7/1924 | (FR) . |
| 957616 | 5/1964 | (GB) . |
| 8-277725 | 10/1996 | (JP) . |
| 65 742 | 4/1950 | (NL) . |
| WO 97/02436 | 1/1997 | (WO) . |
| WO 99/00583 | 1/1999 | (WO) . |

OTHER PUBLICATIONS

Patent Abstracts of Japan, vol. 1997, No. 11, Nov. 28, 1997, JP 09 195702, Jul. 29, 1997.

Patent Abstracts of Japan, vol. 007, No. 063 (M–200), Mar. 16, 1983, JP 57 208319, Dec. 21, 1982.

Patent Abstracts of Japan, vol. 016, No. 051 (M–1209), Feb. 10, 1992, JP 03 253726, Nov. 12, 1991.

James C. Corman, "H Gas Turbine Combined Cycle Technology & Development Status", (ASME paper 96–GT–11), Presented at the International Gas Turbine and Aeroengine Congress & Exhibition. (Birmingham, UK—Jun. 10–13, 1996), pp. 1–8.

\* cited by examiner

*Primary Examiner*—Timothy S. Thorpe
*Assistant Examiner*—David J. Torrente
(74) *Attorney, Agent, or Firm*—Oblon, Spivak, McClelland, Maier & Neustadt, P.C.

(57) ABSTRACT

A gas turbine generally comprises a compressor, a combustor and a turbine body operatively connected to the compressor through a rotation shaft, and the turbine body is composed of a plurality of rotors formed with turbine. discs and movable blades which are arranged in plural stages along an axial direction of the turbine body, in which a rear shaft is connected to a downstream side of a final stage disc of the turbine discs so as to extend rearward from the final stage turbine disc and supported by means of a bearing. The rear shaft is formed with a cooling medium supply passage for supplying a cooling medium to the turbine disc and a cooling medium recovery passage for recovering the cooling medium from the turbine disc, and a further cooling medium passage is formed between the rear shaft and either one of the cooling medium supply passage and the cooling medium recovery passage.

2 Claims, 17 Drawing Sheets

GAS TURBINE

This application is a division of Ser. No. 09/124,977 filed Jul. 30, 1998.

BACKGROUND OF THE INVENTION

The present invention relates to a gas turbine which supplies and discharges a cooling medium to and from a high temperature section of the gas turbine.

Recently, a high temperature gas turbine has been developed and improved, and the temperature of the gas turbine is becoming 1500° C. or more from a temperature ranging from 700° C. or 900° C. to 1000° C. or 1300° C. in the prior art technology.

Under such circumstances that the temperature of the gas turbine is rapidly made high, a superalloy steel (heat resisting alloy steel) has been developed, and the superalloy steel has applied to a high temperature section such as a turbine stationary blade and a turbine rotor blade of the gas turbine. However, the superalloy steel has exceeded its usable limit, and for this reason, there has been employed an air cooling technique of compensating for lack of material strength with the use of air. Further, in a recent gas turbine, in order to achieve a high power generation and a high heat efficiency of the gas turbine, there is a plan to make 1500° C. or more a gas turbine combustion gas temperature (gas turbine inlet combustion gas temperature). In the case where a test (trial) calculation of plant heat efficiency is made with the use of the air cooling technique applied, a disadvantage occurs therein, and for this reason, a cooling medium is transferred from the air to a steam.

There have been proposed many gas turbines which use a steam as a cooling medium and one example of such gas turbines is disclosed in Japanese Patent Laid-Open Publication No. HEI 8-277725, in which FIG. 1 shows an general arrangement of the gas turbine composed a compressor, a combustor and a turbine main body including a plurality of rotors formed with discs and movable blades arranged in stages along an axial direction of the gas turbine.

As shown in FIG. 17 and FIG. 18, a steam supply passages 3 and steam recovery passages 4 are formed in a gas turbine disc 2 molded integrally with a gas turbine rotor 1 which is formed in a sectional type, a plurality of the gas turbine rotors being arranged in an axial direction thereof. A steam supplied from a rear shaft (not shown) is supplied to a gas turbine rotor blade 6 with the use of a cavity 5, and then, is cooled, and thereafter, the steam is recovered to the rear shaft via the recovery passage 4.

Meanwhile, as shown in FIG. 19, in the gas turbine, the gas turbine disc 2 including a final stage gas turbine rotor blade 6 is provided with a rear shaft 8, and a partition 14 is formed so as to divide an interior of the rear shaft 8 into the steam supply passage 3 on the center side and the steam recovery passage 4 on the opposite side. Further, the rear shaft 8 is provided a journal bearing 12 which includes a bearing housing 9, a pad 10, a retainer 11 or the like, at the outer side thereof, and is provided with a recovery pipe 13 for recovering a steam.

As described above, in Japanese Patent Laid-open Publication No. HEI 8-277725 shown in FIG. 17, FIG. 18 and FIG. 19, the cooling steam is supplied and discharged by way of the rear shaft 8 so as to reduce a thermal stress generated in the gas turbine rotor 1, the gas turbine disc 2 and the gas turbine rotor blade 6, and thus, it is possible to cope with the gas turbine from being made high temperature. Incidentally, in FIG. 18, a portion shown with oblique lines is a stacking bolt hole 7 for fixing the gas turbine disc 2 which is formed in a sectional type.

In the arrangement of the Japanese Patent Laid-open Publication No. HEI 8-277725 shown in FIGS. 17, 18 and 19, a temperature of the cooling steam supplied to the high temperature section of the gas turbine and a temperature of the recovery steam are respectively set to 250° C. , and 450° C. in order to restrict the temperature of these steams less than the allowable temperature of each material of the gas turbine rotor 1 and the gas turbine disc 2.

However, both the temperature 250° C. of the cooling steam supplied to the high temperature section of the gas turbine and the temperature 450° C. of the recovery steam far exceeds a allowable temperature of the journal bearing 12 supporting the rear shaft 8.

In general, in the journal bearing 12, a temperature of each metal component is restricted so as to be 100° C. to 150° C. even if a radiation heat of gas turbine combustion gas is added to a radiation heat of lubricating oil. However, in the case where the cooling and recovery steam temperatures are high, white metal adhered on a sliding surface of an inner ring of the bearing is melted, and for this reason, there is the possibility that the gas turbine falls into a dangerous state during operation.

Therefore, in the gas turbine, the steam temperature required for cooling the high temperature section of the gas turbine is secured, and there is the need of taking measures for stably operating the journal bearing 12.

SUMMARY OF THE INVENTION

An object of the present invention is to substantially eliminate defects or drawbacks encountered in the prior art mentioned above and to provide a gas turbine provided with an improved structure for stably operating a journal bearing of a turbine rear shaft and effectively cooling a high temperature section of the gas turbine while effectively recovering a cooling medium.

This and other objects can be achieved according to the present invention, by providing a gas turbine having the general structure comprising a compressor, a combustor and a turbine body operatively connected to the compressor through a rotation shaft, the turbine body being composed of a plurality of rotors formed with turbine discs and movable blades which are arranged in plural stages along an axial direction of the turbine body, in which a rear shaft is connected to a downstream side of a final stage disc of the turbine discs so as to extend rearward from the final stage turbine disc and supported by means of a bearing.

In one aspect, the rear shaft is formed with a cooling medium supply passage for supplying a cooling medium to the turbine disc and a cooling medium recovery passage for recovering the cooling medium from the turbine disc, and a further cooling medium passage is formed between the rear shaft and either one of the cooling medium supply passage and the cooling medium recovery passage.

The further cooling medium passage is composed of an air passage, and the air passage is provided at an inlet thereof with an air guide portion and is formed at an outlet thereof with an air flow outlet extending along a radial direction of the rear shaft. The air guide portion is formed of a circular hole including a notched groove at an inlet portion thereof, and the air guide portion is composed of a disc-shaped retaining member and a ring member and includes guide vanes arranged annularly between the retaining member and the ring member.

In another aspect, the rear shaft is formed with a cooling medium supply passage for supplying a cooling medium to the gas turbine disc and a cooling medium recovery passage for recovering the cooling medium from the gas turbine disc, and a labyrinth seal is provided between the gas turbine disc and the bearing, the labyrinth seal being formed with a cooling medium supply hole which communicates with the cooling medium supply passage and a cooling medium recovery hole which communicates with the cooling medium recovery passage.

In a further aspect, the rear shaft is formed with a cooling medium supply passage for supplying a cooling medium to the turbine disc and a cooling medium recovery passage for recovering the cooling medium from the turbine disc, and a labyrinth seal is provided between the gas turbine disc and the bearing, the labyrinth seal being formed with a cooling medium supply hole which communicates with the cooling medium supply passage and a cooling medium recovery hole which communicates with the cooling medium recovery passage, and a cooling medium passage is further formed in the rear shaft supported by means of the bearing.

In a still further aspect, the rear shaft is formed with a cooling medium supply passage for supplying a cooling medium to the turbine disc and a cooling medium recovery passage for recovering the cooling medium from the turbine disc, and a heat insulating portion is formed between the rear shaft and either one of the cooling medium supply passage and the cooling medium recovery passage.

The heat insulating portion is made of a ceramic composite material, and the ceramic composite material is ceramic fiber and ceramic matrix. The heat insulating portion is arranged along a circumferential direction of a cylindrical portion of the cooling medium recovery passage formed to the rear shaft and the cylindrical portion member. The heat insulating portion is intermittently arranged along a circumferential direction of a cylindrical portion of the cooling medium recovery passage formed to the rear shaft and the cylindrical member.

In a still further aspect, the rear shaft is formed with a cooling medium supply passage for supplying a cooling medium to the turbine disc and a cooling medium recovery passage for recovering the cooling medium from the turbine disc, and a pump connected to a bearing housing of the bearing is provided so as to supply the cooling medium to a cooling medium passage formed between the rear shaft and the cooling medium recovery passage by means of the pump.

According to the various aspect of the present invention described above, in the gas turbine of the present invention, the cooling steam supply passage and the cooling steam recovery passage are provided in the rear shaft, and the air passage or the heat insulating portion is formed between at least one of the cooling steam supply passage and the cooling steam recovery passage and the rear shaft. Further, it is possible to shield and reduce the radiation heat of the recovery steam transmitted from the cooling steam supply passage or from the cooling steam recovery passage to the rear shaft. Therefore, the journal bearing can be securely and stably operated, and it is also possible to sufficiently cope with the high temperature of the gas turbine.

The further nature and characteristic features of the present invention will be made more clear from the following descriptions made with reference to the accompanying drawings.

DESCRIPTION OF THE PREFERRED EMBODIMENTS

Preferred embodiments of the present invention will be described hereunder with reference with the accompanying drawings.

Figure 20:
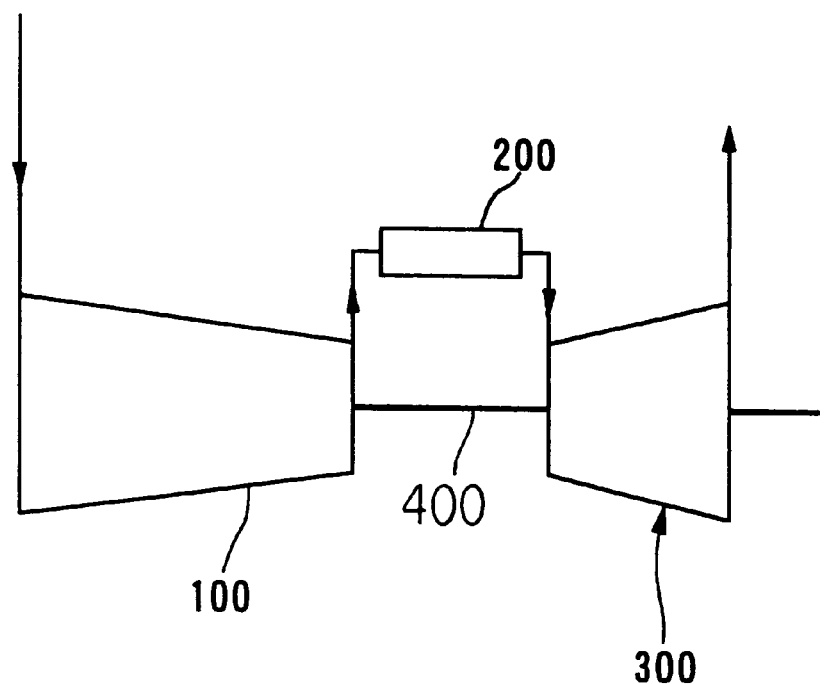
FIG. 20 is a schematic view of a gas turbine arrangement to which the present invention is applicable.

A general structure of a gas turbine is shown in FIG. 20 to which the present invention is applicable. Referring to FIG. 20, a gas turbine comprises a compressor 100, a combustor 200 and a turbine body 300, and the combustor 200 is operatively connected to the compressor 100 and the turbine body 300. The compressor 100 is also connected to the turbine body 300 through a rotation shaft, i.e. driving shaft 400. The turbine body 300 is composed of a plurality of rotors formed with discs and movable blades arranged in stages along the axial direction of the gas turbine.

A gas turbine may be also provided with a controller, a heat exchanger, a re-heater and so on as occasion demands, though not shown in FIG. 20.

Figure 1:
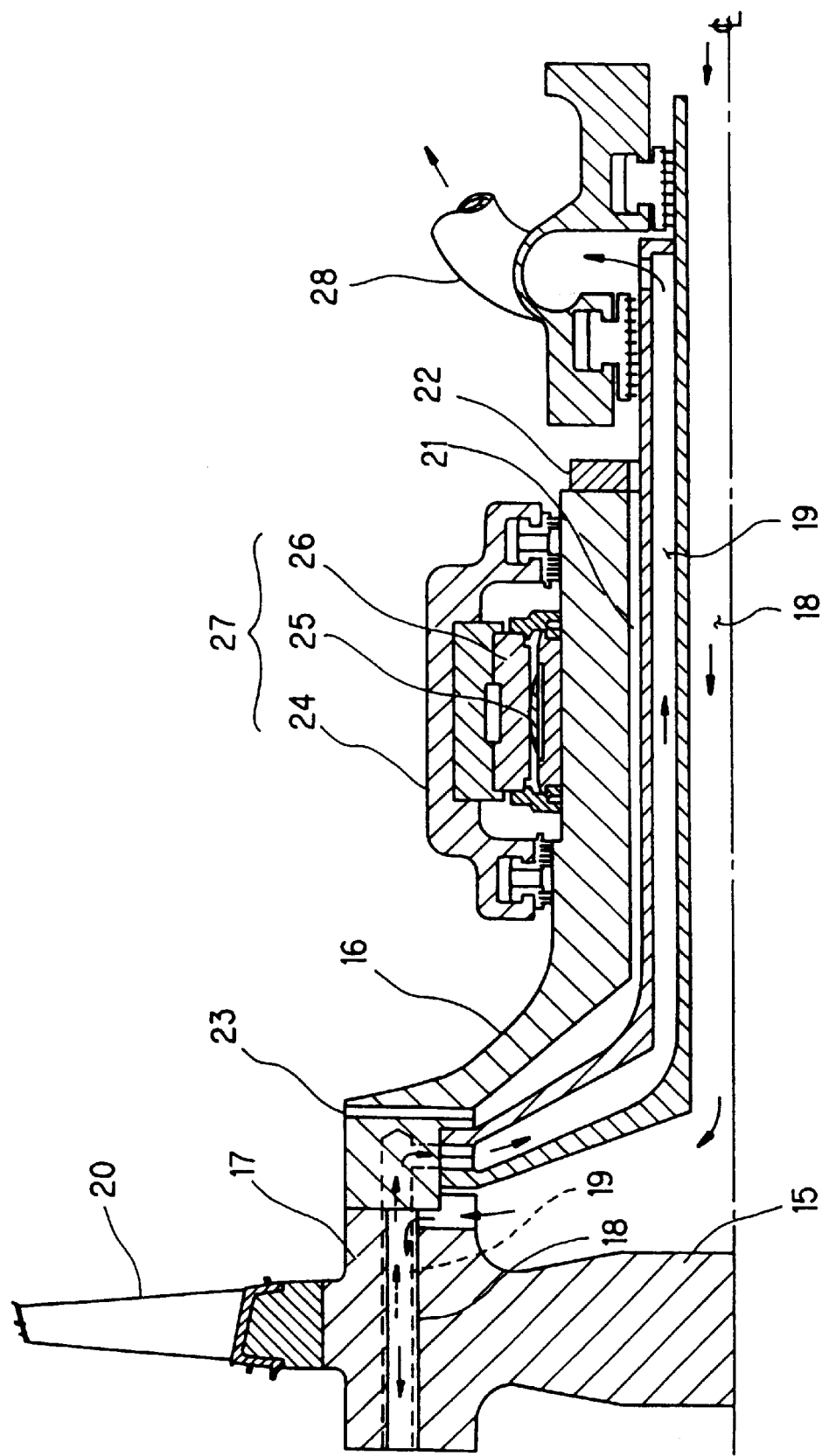
FIG. 1 is a cross-sectional view schematically showing an upper half portion of a main body of a gas turbine according to a first embodiment of the present invention.

FIG. 1 is a cross-sectional view schematically showing an upper half portion of a (main) body of a gas turbine first embodiment according to the present invention.

According to this first embodiment, the gas turbine is provided with a gas turbine rotor 15 and a rear shaft 16 arranged so as to extend rearward from the final stage turbine disc in a downward direction.

The gas turbine rotor 15 includes a gas turbine disc 17 which is formed in a sectional type and is molded integrally with the gas turbine rotor 15. The gas turbine disc 17 is formed with a cooling steam supply passage 18 and a cooling steam recovery passage 19 for recovering a cooling steam, at the interior thereof. Further, a gas turbine rotor blade 20 is provided on the top portion of the cooling steam supply passage 18 and the cooling steam recovery passage 19. A plurality of gas turbine discs 17 molded integrally with the gas turbine rotor 15 are arranged along the axial direction, and the details are omitted for convenience of explanation.

On the other hand, the rear shaft 16 connected to the downstream side of the final stage of the gas turbine disc 17 is provided with a cylindrical cooling steam recovery passage 19 at the interior thereof. The cooling steam supply passage 18 is formed on the axial side outside the passage 19, and an air passage 21 is formed on the opposite side of the rear shaft 16. The air passage 21 includes an air guide portion 22 at an inlet side thereof, and an air flow outlet 23 which has a relatively long distance and extends in a radius direction thereof. Further, a diameter of the air passage 21 is set so as to make high the air flow speed so as to secure interruption without alternately mixing a heat from the recovery steam of the cooling steam recovery passage 19 with a heat from a lubricating oil of a journal bearing 27.

The rear shaft 16 is provided with a journal bearing 27 which includes a bearing housing 24, a pad 25 a retainer 26 or the like, at the outside thereof, and further, is provided with a cooling steam recovery pipe for recovering the cooling steam.

Figure 2:
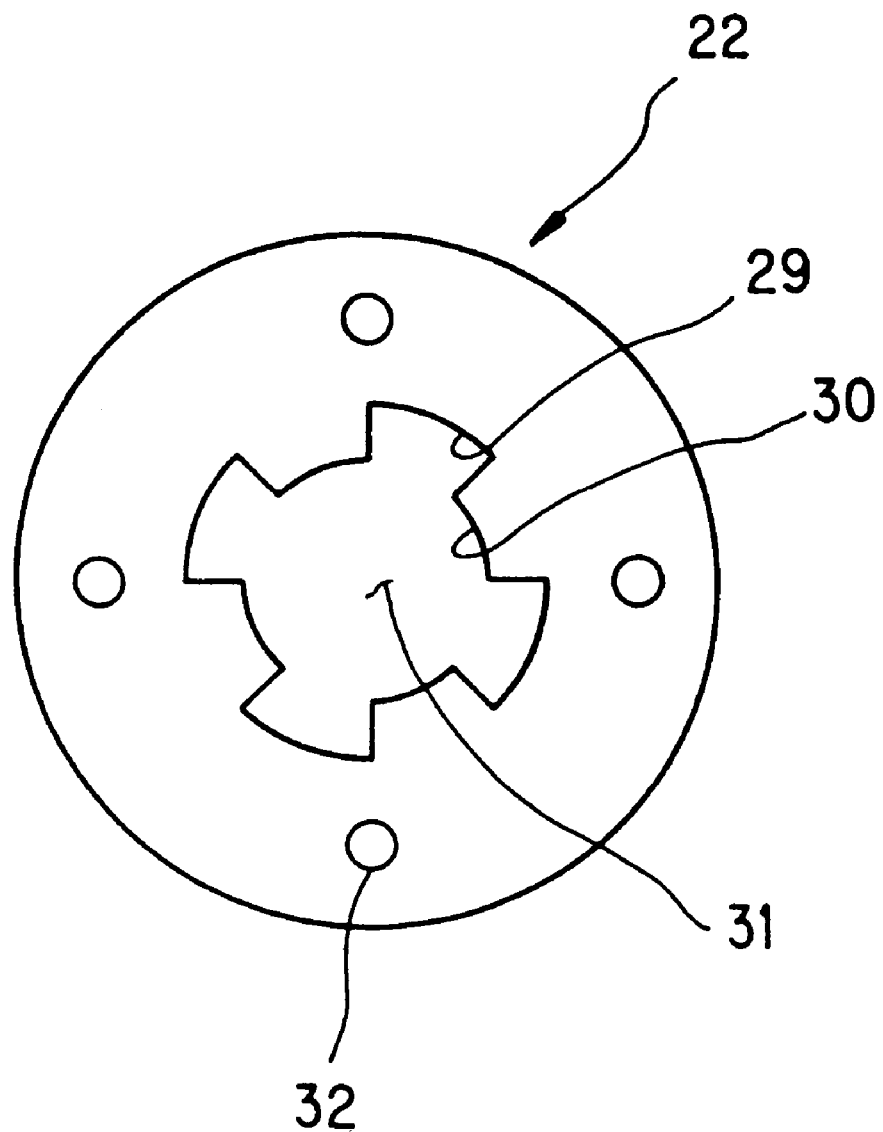
FIG. 2 is a view schematically showing an air guide portion in the gas turbine according to the first embodiment of the present invention.

As shown in FIG. 2, the air guide portion 22 is formed with an inlet 31 which is a circular hole 30 including a notched groove 29 and is connected to the end portion of the rear shaft 16 shown in FIG. 1 by means of a bolt via a bolt hole 32.

Figure 4:
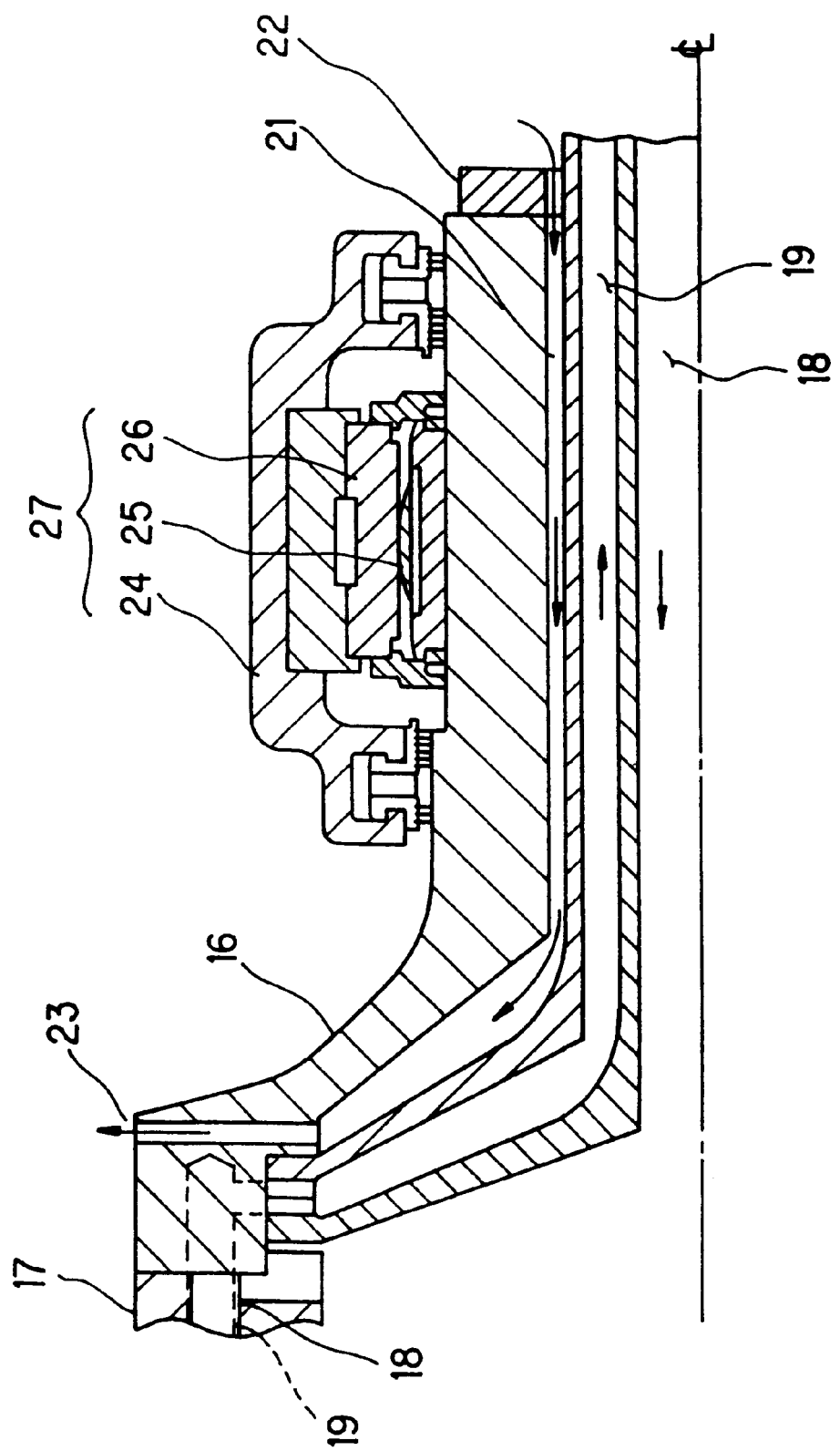
FIG. 4 is a view to explain a movement of an air flowing through an air passage of the gas turbine according to the first embodiment of the present invention.

As described above, in this embodiment, the air passage 21 is formed outside the cylindrical cooling steam recovery passage 19 formed in the rear shaft 16, and as shown in FIG. 4, an air layer is formed by the air guided from the air guide portion 22 to shield a heat of the recovery steam of the cooling steam recovery passage 19. Further, air is always circulated so that the air flows outside the system by means of a pumping effect of the air flow outlet 23. Therefore, the air makes it possible to reduce the radiation heat by a high temperature steam passing through the cooling steam recovery passage 19 to the rear shaft 16, and thus, the journal bearing can be stably operated.

In this first embodiment, in order to cool the high temperature section of the gas turbine, even if the cooling steam is supplied and discharged at high temperature, the journal bearing 27 is stably operated without causing hindrance thereto. It is therefore possible to sufficiently cope with the high temperature of the gas turbine.

Figure 3:
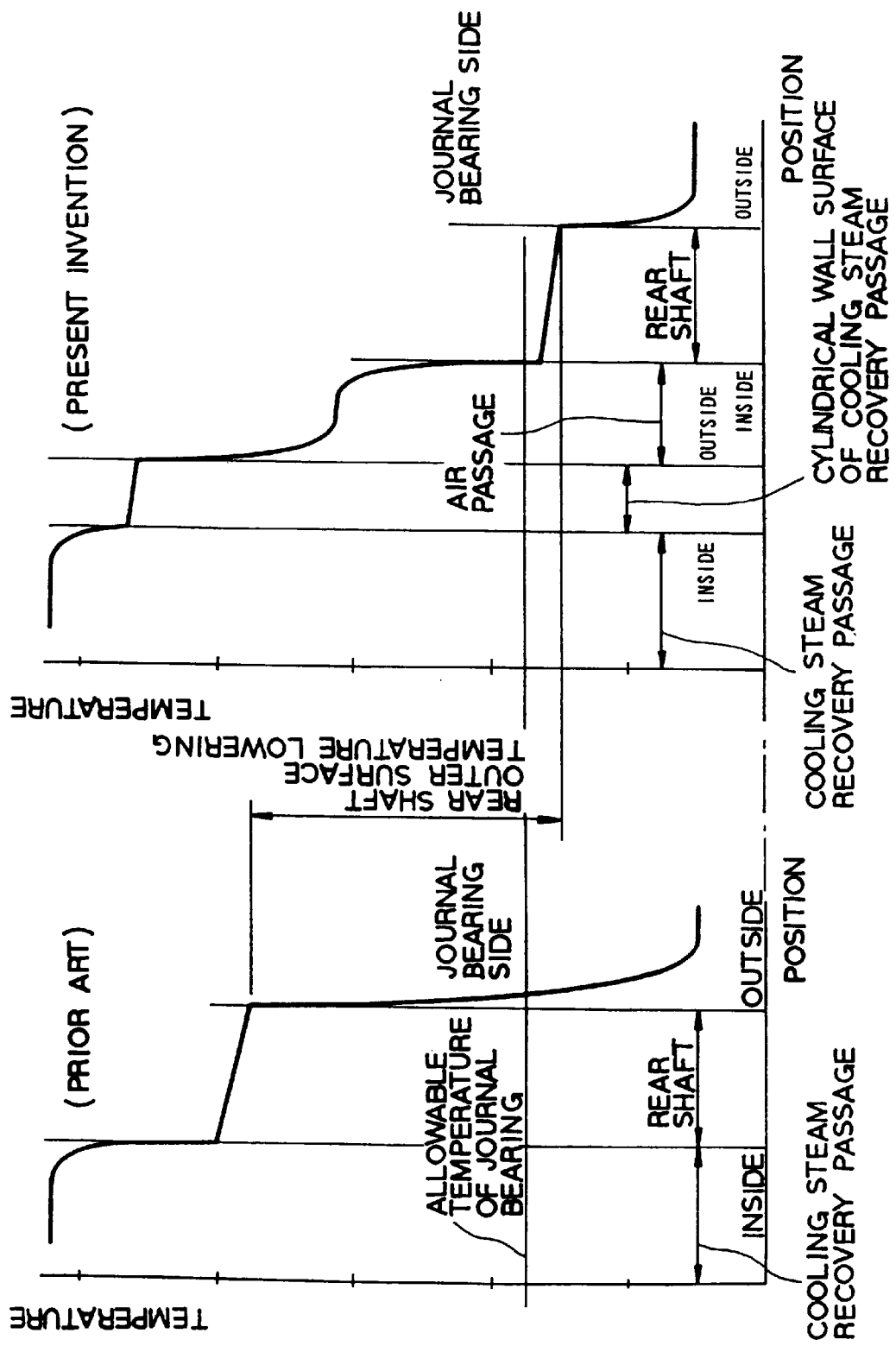
FIG. 3 is a diagram showing a temperature distribution comparison between the prior art and the present invention in the case where a radiation heat of steam transmits to a journal bearing side.

FIG. 3 is a diagram showing a temperature distribution comparison between a prior art and the present invention in the case where a radiation heat of the recovery steam passing through the cooling steam recovery passage 19 transmits through the journal bearing 27 side.

In this embodiment, since the air passage 21 is formed between the cooling steam recovery passage 19 and an inner wall of the rear shaft 16, it is found from the diagram that the radiation heat transmitted from the recovery steam of the cooling steam recovery passage 19 to the rear shaft 16 becomes less than the allowable temperature of the journal bearing 27. Therefore, the journal bearing 27 can be stably operated. Thus, it will be found that the present invention is superior to the conventional technology.

Figure 5:
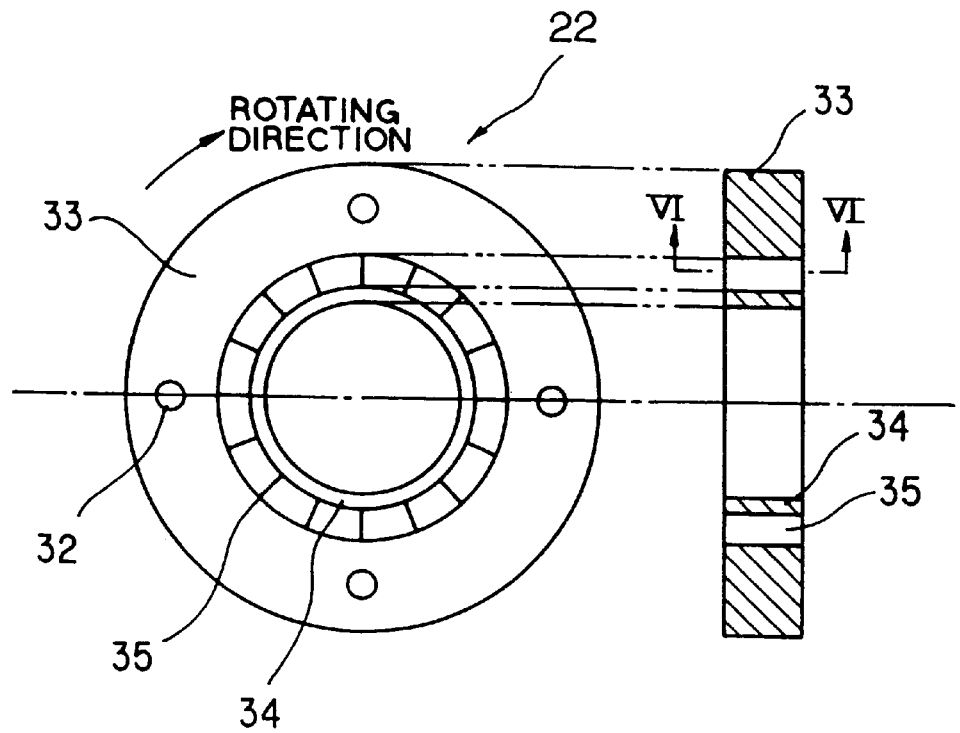
FIG. 5 is a view schematically showing an air guide portion of the gas turbine according to the first embodiment of the present invention.

FIG. 5 is a view schematically showing one example of the air guide portion 22 in the gas turbine according to the first embodiment of the present invention.

The air guide portion 22 is constructed in a manner that a straight guide vane 35 is interposed between a disc-like retaining member 33 and a ring member 34 so as to form an annular shape. Further, the air guide portion 22 is connected to the end portion of the rear shaft 16 shown in FIG. 1 by means of a bolt via a bolt hole 32.

Figure 6:
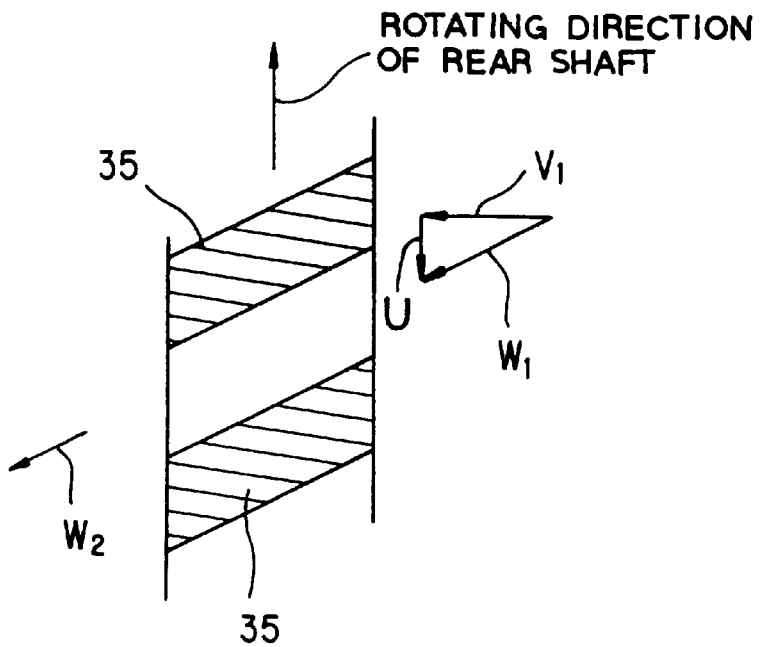
FIG. 6 is a cross-section viewed from an arrow VI—VI of FIG. 5.

As shown in FIG. 6, the guide vane 35 is constructed in a manner that outside air flows at an inlet relative speed W1 as the sum of a vector of an air absolute speed (velocity) V1 and a peripheral speed U of the rotating rear shaft 16, and the air is supplied to the air passage 21 shown in FIG. 1 at an outlet relative speed W2. In the guide vane 35, the outlet may be made relatively narrow as compared with the inlet in order to improve a forced pressure of air. Further, a blade of the vane may be formed into a curved shape so as to give a spiral flow to the air.

As described above, in the first embodiment, the air guide portion 22 is provided with the guide vane 35 so that the air from the exterior can be securely guided into the air passage 21. Thus, it is possible to reduce a radiation heat by high temperature steam of the cooling steam recovery passage 19, and thereby, the journal bearing 27 can be stably operated.

Figure 7:
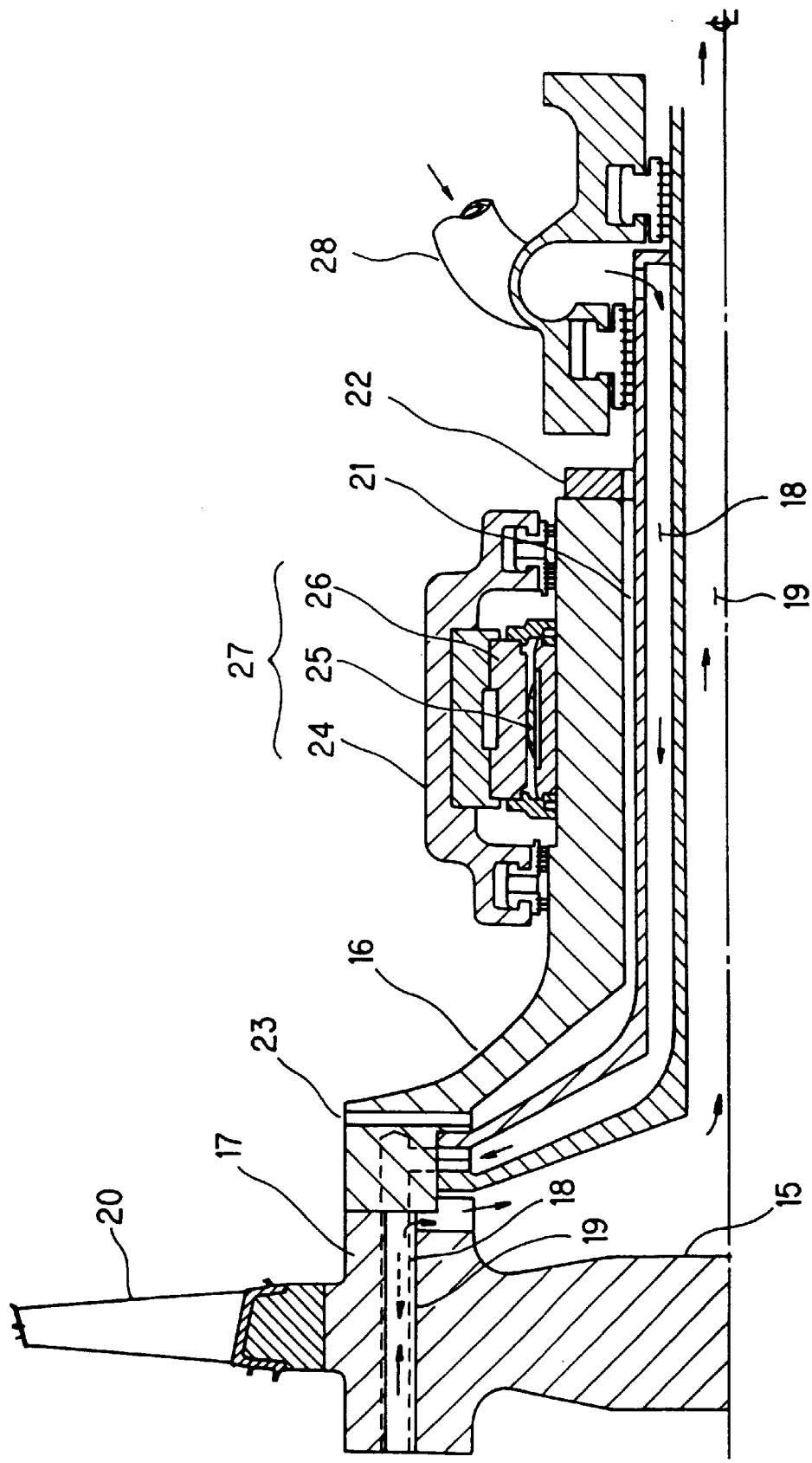
FIG. 7 is a cross-sectional view schematically showing an upper half portion of a main body of a gas turbine according to a second embodiment of the present invention.

FIG. 7 is a cross-sectional view showing an upper half portion of a main body of a gas turbine according to a second embodiment of the present invention, in which like reference numerals are used to designate the same components as those of the first embodiment.

In this second embodiment, an interior of the rear shaft 16 is formed with a cylindrical cooling steam supply passage 18 and a cooling steam recovery passage 19 on the axial side outside the supply passage 18, and further, is formed with the air passage 21 on the rear shaft 16 side on the opposite side thereof. Namely, these cooling steam supply passage 18 and cooling steam recovery passage 19 are arranged reverse to the arrangement shown in the first embodiment.

As described above, in this embodiment, even if a steam temperature of the cooling steam supply passage 18 is high temperature as described before, that is, for example, 250° C., the heat is shielded by means of the air of the air passage, so that the journal bearing 27 can be stably operated.

Figure 8:
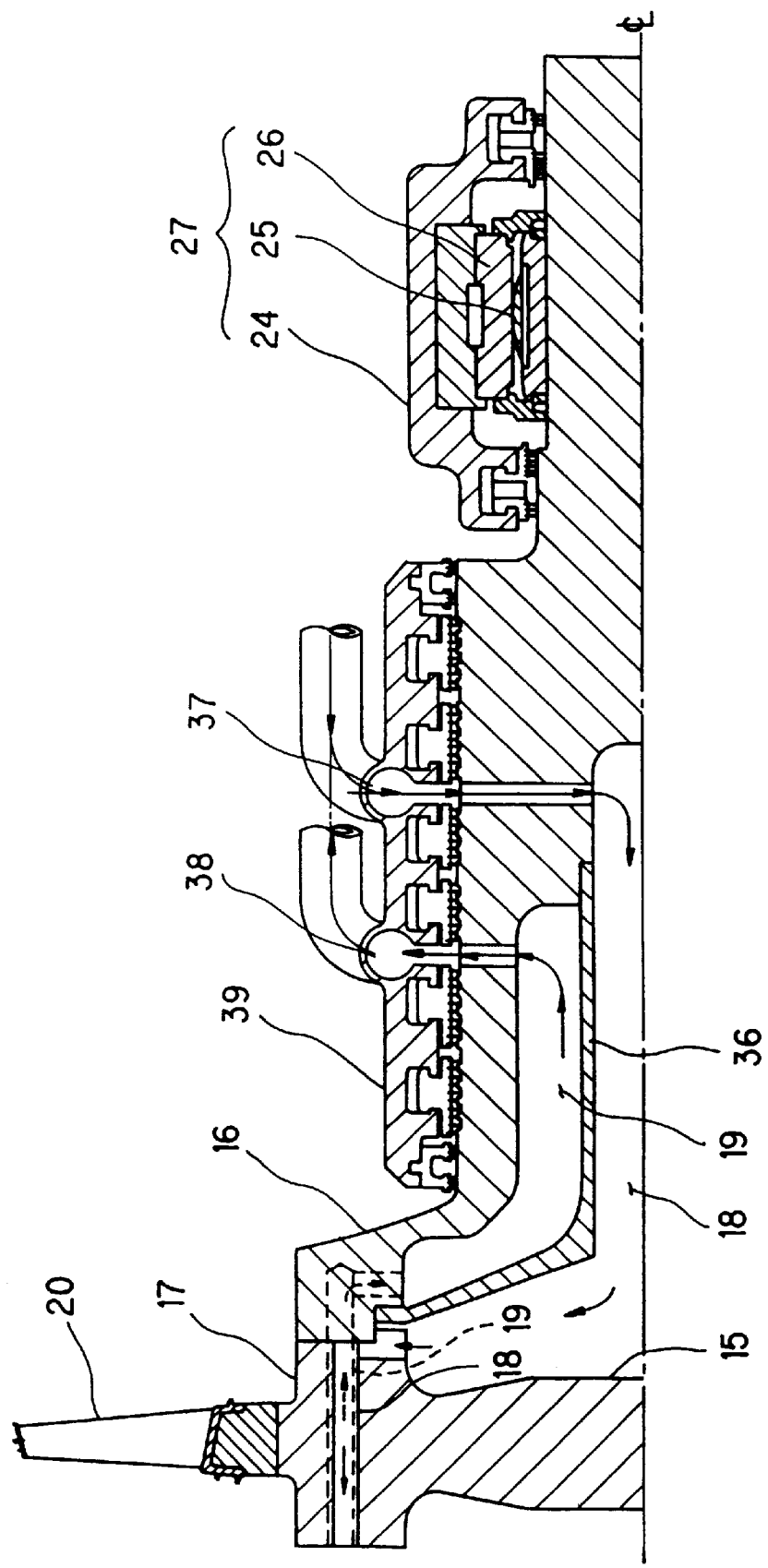
FIG. 8 is a cross-sectional view schematically showing an upper half portion of a main body of a gas turbine according to a third embodiment of the present invention.

FIG. 8 is a cross-sectional view showing an upper half portion of a main body of a gas turbine according to a third embodiment of the present invention, in which like reference numerals are used to designate the same components as those of the first embodiment.

With large capacity of the gas turbine, the rear shaft 16 between the final stage of the gas turbine disc 17 and the journal bearing 27 has a relatively wide space.

This third embodiment is made by considering the space, in which a cooling steam supply hole 37 and a cooling steam recovery hole 38 are formed so as to communicate with each of the cooling steam supply passage 18 and the cooling steam recovery passage 19, which are partitioned by means of a partition 36 provided in the rear shaft. Further, these cooling steam supply hole 37 and cooling steam recovery hole 38 are provided in a labyrinth seal portion 39.

As described above, in this embodiment, the labyrinth seal portion 39 is provided on the rear shaft 16 between the final stage of the gas turbine disc 17 and the journal bearing 27, and further, the cooling steam supply hole 37 and the cooling steam recovery hole 38 are formed in the labyrinth seal portion 39 so as to communicate with each of the cooling steam supply passage 18 and the cooling steam recovery passage 19. Therefore, it is possible to prevent the radiation heat by the steam passing through the cooling steam supply passage 18 and the cooling steam recovery passage 19 from being transmitted to the journal bearing 27, so that the journal bearing 27 can be stably operated.

Furthermore, in this embodiment, the cooling steam supply hole 37 and the cooling steam recovery hole have been formed in the labyrinth seal portion 39 provided on the rear shaft 16 between the final stage of the gas turbine disc 17 and the journal bearing 27.

Figure 9:
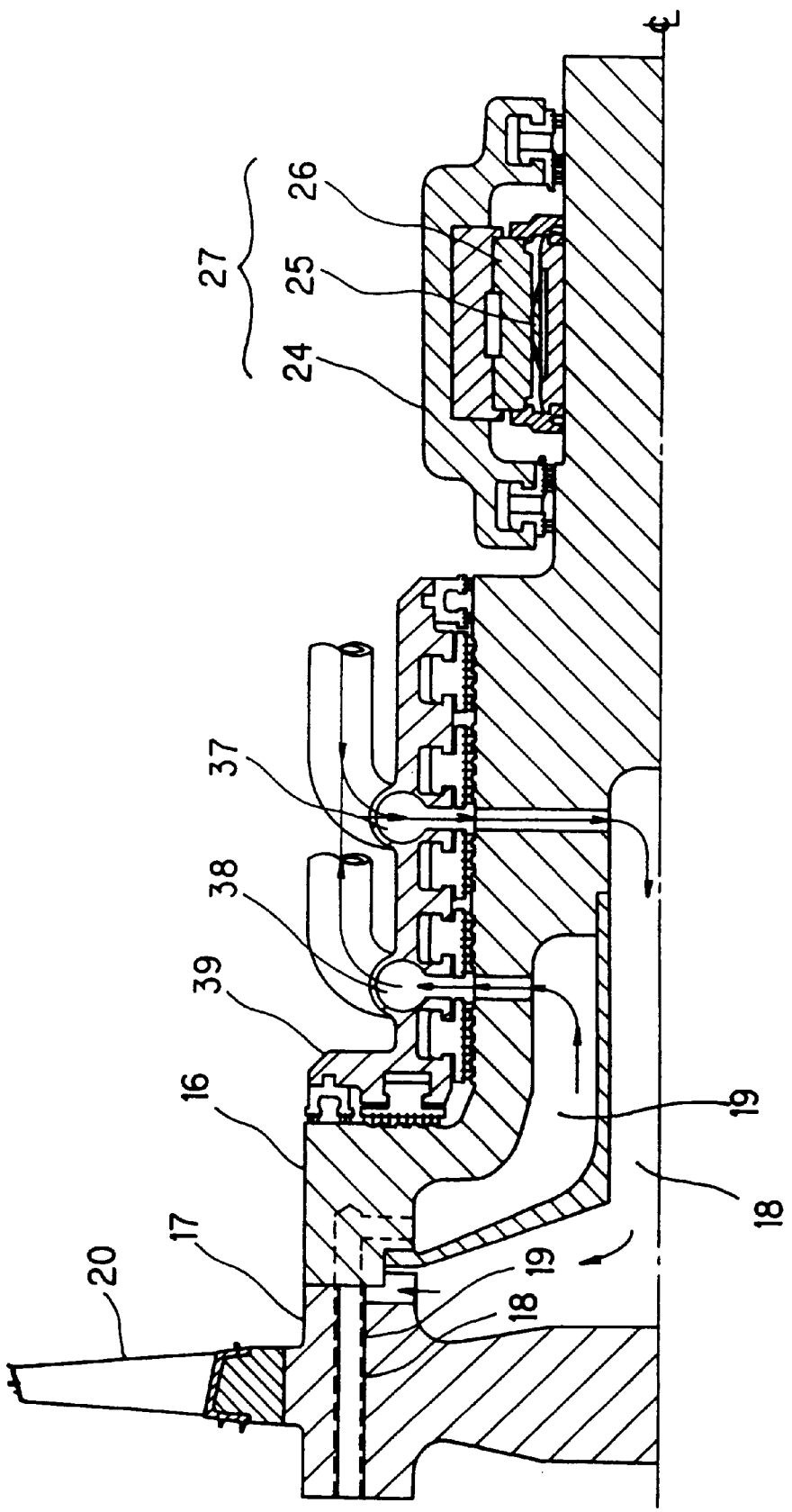
FIG. 9 is a cross-sectional view schematically showing a modification example of an upper half portion of the gas turbine according to a third embodiment of the present invention.
Figure 10:
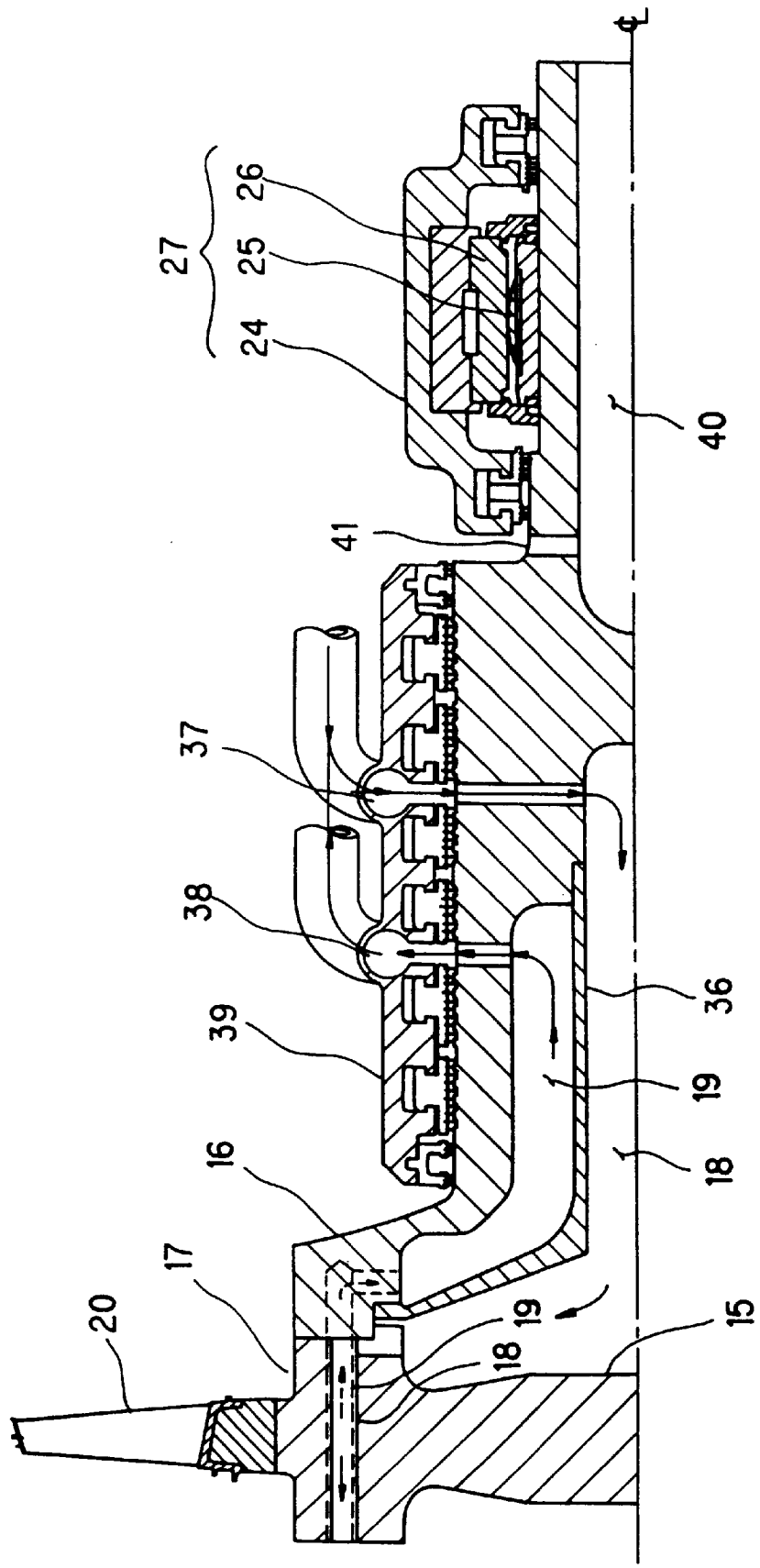
FIG. 10 is a cross-sectional view schematically showing a modification example of an upper half portion of the gas turbine according to the third embodiment of the present invention.

The present invention is not particularly limited to this embodiment. For example, as shown in FIG. 9, the labyrinth seal portion 39 may be extended to a shoulder portion of the rear shaft 16 connected to the final stage of the gas turbine disc 17. Further, for example, as shown in FIG. 10, an air passage 40 and an air flow outlet 41 may be formed in the rear shaft supported by the journal bearing 27. In the example shown in FIG. 9, a span between the final stage of the gas turbine disc 17 and the journal bearing 27 is shortened, thus, being advantageous. On the other hand, in the example shown in FIG. 10, the rear shaft 16 is cooled by an air of the air passage 40, so that the journal bearing 27 can be securely and stably operated.

Figure 11:
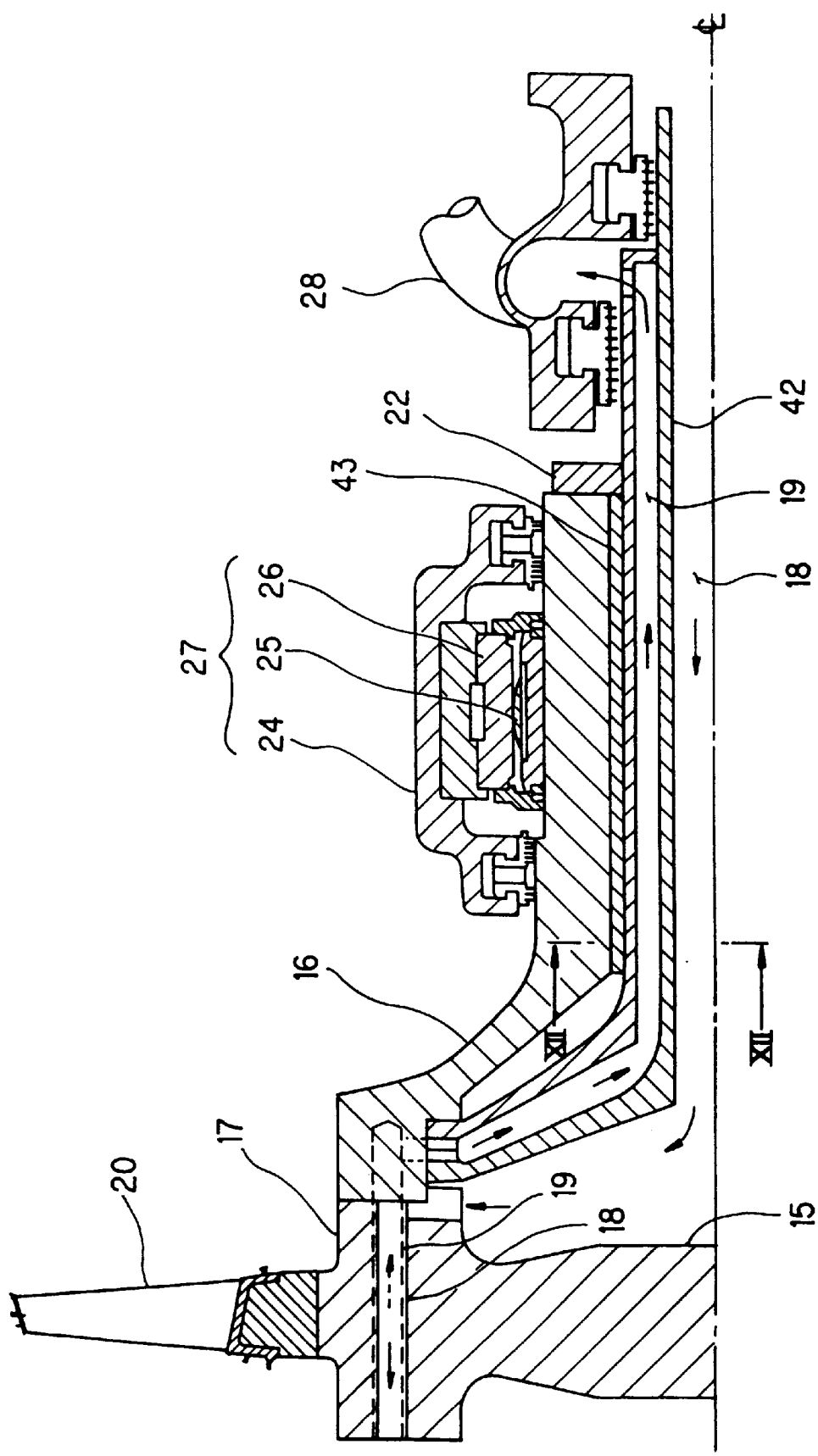
FIG. 11 is a cross-sectional view schematically showing an upper half portion of a main body of a gas turbine according to a fourth embodiment of the present invention.

FIG. 11 is a cross-sectional view showing an upper half portion of a main body of a gas turbine according to a fourth embodiment of the present invention, in which like reference numerals are used to designate the same components as those of the first embodiment.

In this fourth embodiment, the interior of the rear shaft 16 is formed with the cooling steam recovery passage 19 formed of a cylindrical member 42, and the cooling steam supply passage 18 on the axial side outside the recovery passage 19, and further, a heat insulating portion 43 is provided on the rear shaft side on the opposite side of the recovery passage 19.

Figure 12:
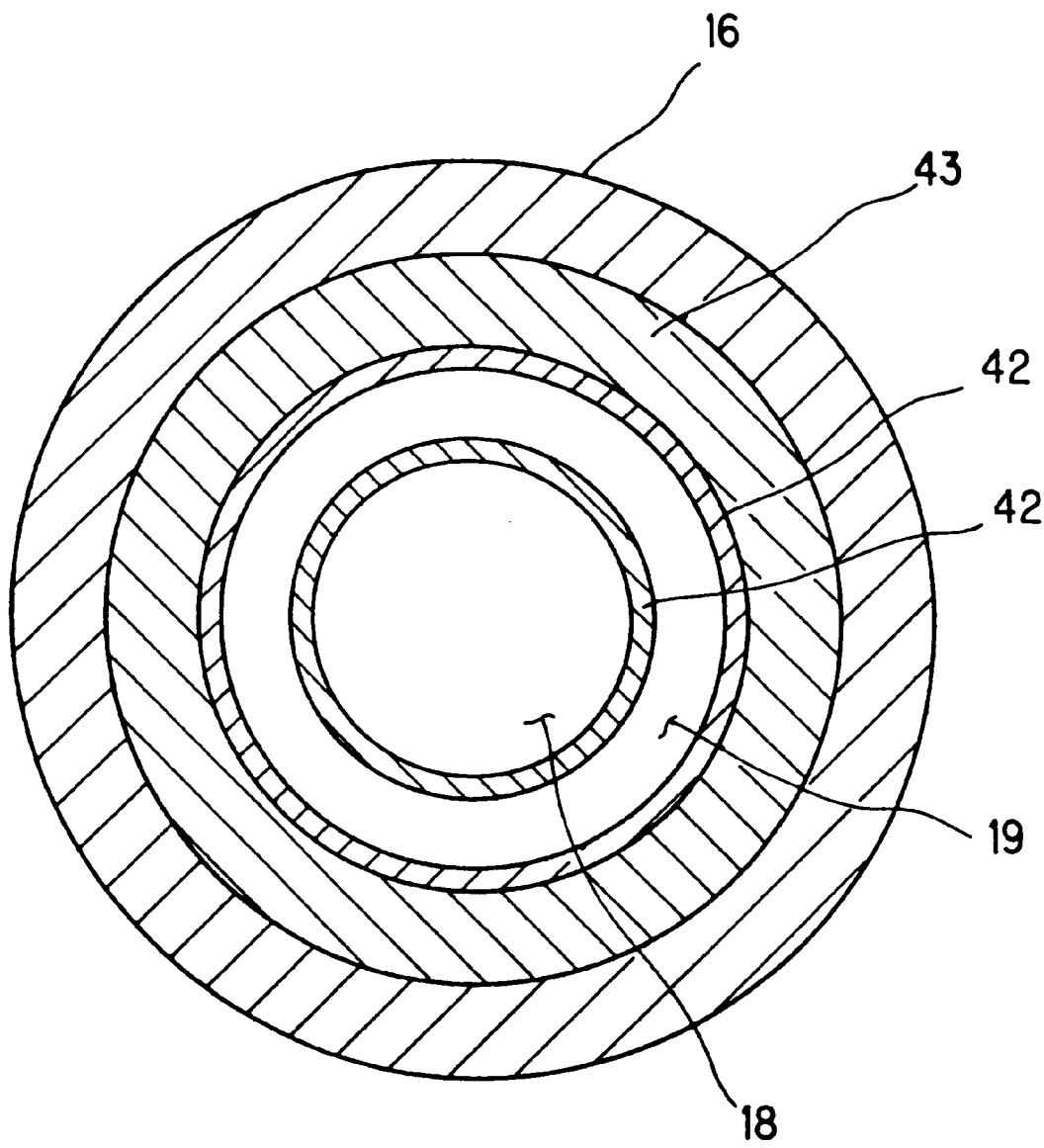
FIG. 12 is a cross-section viewed from an arrow XII—XII of FIG. 11.

As shown in FIG. 12, the heat insulating portion 43 is interposed between the cylindrical member 42 and the rear shaft 16 along the circumferential direction thereof and is made of a ceramic composite material such as fiber SiC, matrix SiC. Further, a ceramic composite material having a heat conductivity of 1 Wm$^{-1}$ K$^{-1}$ is selected. On the other hand, the rear shaft 16 is made of 12 chromium steel having a heat conductivity of 30 Wm$^{-1}$ K$^{-1}$. Further, a heat resistance R in the case where plural substances exist is obtained from the following mathematical equation (1), assuming that a thickness of the substance is set as T, a heat conductivity is set as K, and a heat passage area is set as A.

[Equation (1)]

$$R=\Sigma(T/kA) \qquad (1)$$

If a thickness of the heat insulating portion 43 is set five times as much as the diameter of the cooling steam recovery passage 19 formed of the cylindrical member 42, from the calculation of the above expression (1), the heat resistance becomes 15 times as compared with the case of no heat insulating portion 43.

Figure 13:
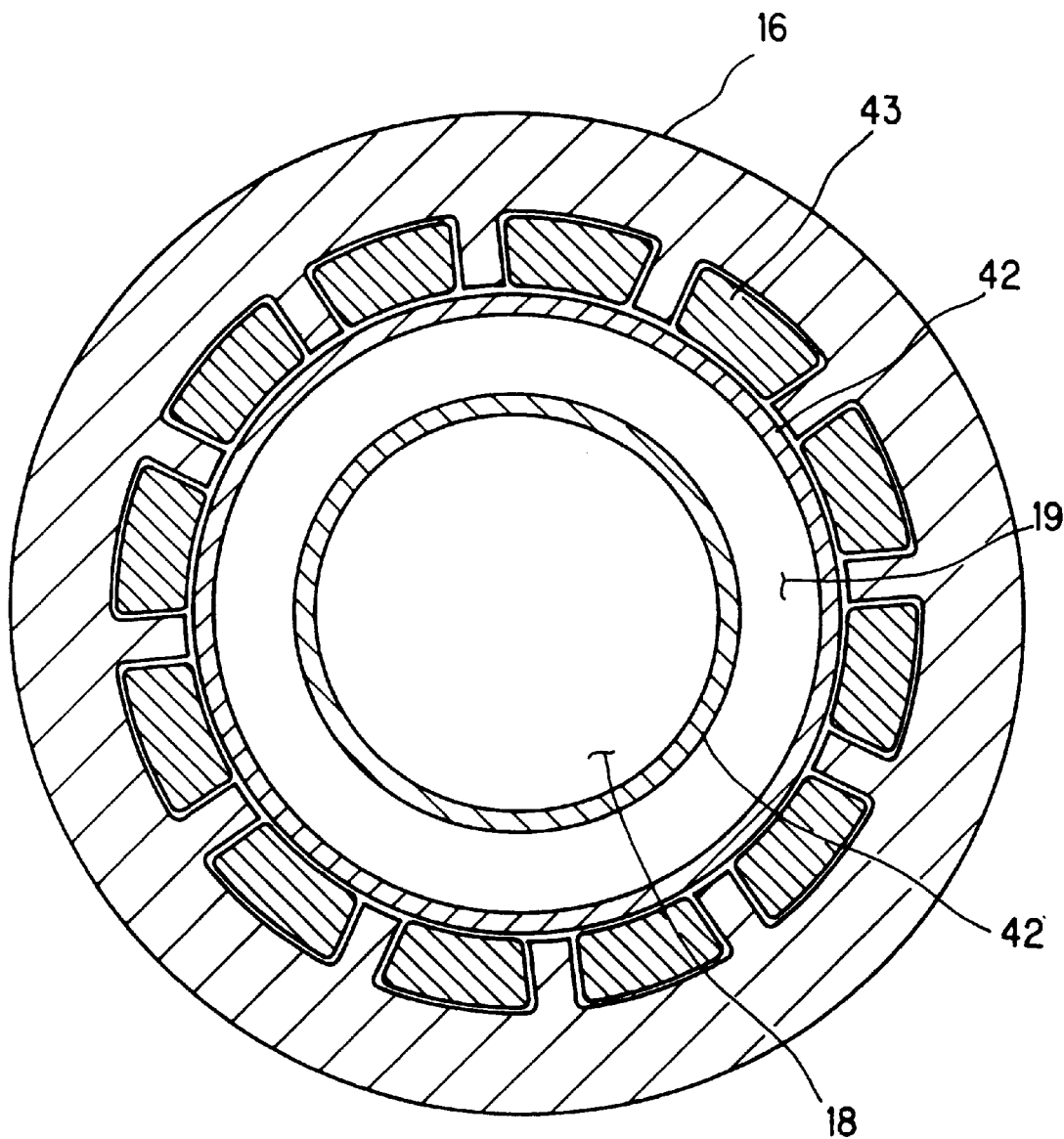
FIG. 13 is a cross-sectional view showing a heat insulating portion of the gas turbine according to the fourth embodiment of the present invention.
Figure 14:
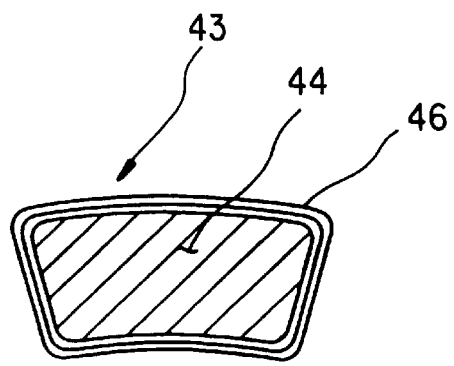
FIG. 14 is a cross-sectional view showing a modification example of the heat insulating portion of the gas turbine according to the fourth embodiment of the present invention.
Figure 15:
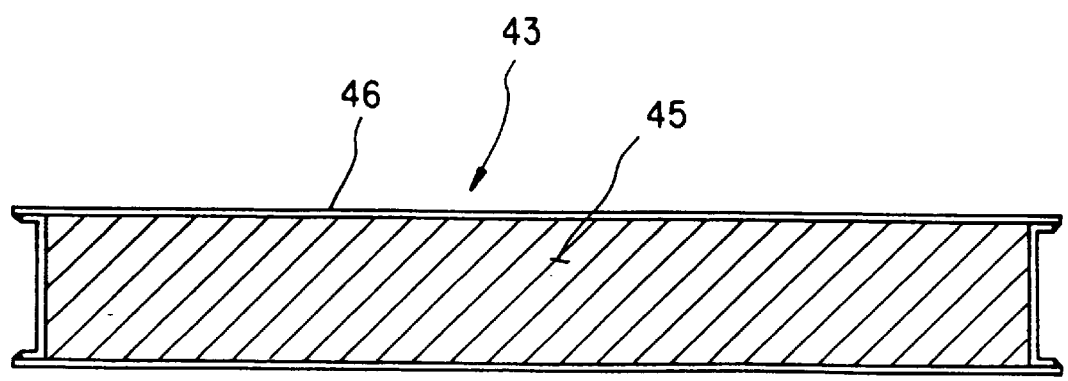
FIG. 15 is a view showing a shape of the heat insulating portion of the gas turbine according to the fourth embodiment of the present invention.

Therefore, in this embodiment, the heat insulating portion 43 made of ceramic composite material is interposed between the cooling steam recovery passage 19 formed of the cylindrical member 42 and the rear shaft 16 so as to improve a heat resistance. Thus, it is possible to sufficiently shield the radiation heat of the recovery steam and to stably operate the journal bearing 27. Further, as shown in FIG. 13, the heat insulating portion 43 may be continuously arranged along the circumferential direction of the cylindrical member 42. In addition, the heat insulating portion 43 has a shape of rectangle 44 in its cross section, as shown in FIG. 14 and may be formed into a strip shape 45 extending to the axial direction so as to be hosed in an outer cover 46, as shown in FIG. 15.

Figure 16:
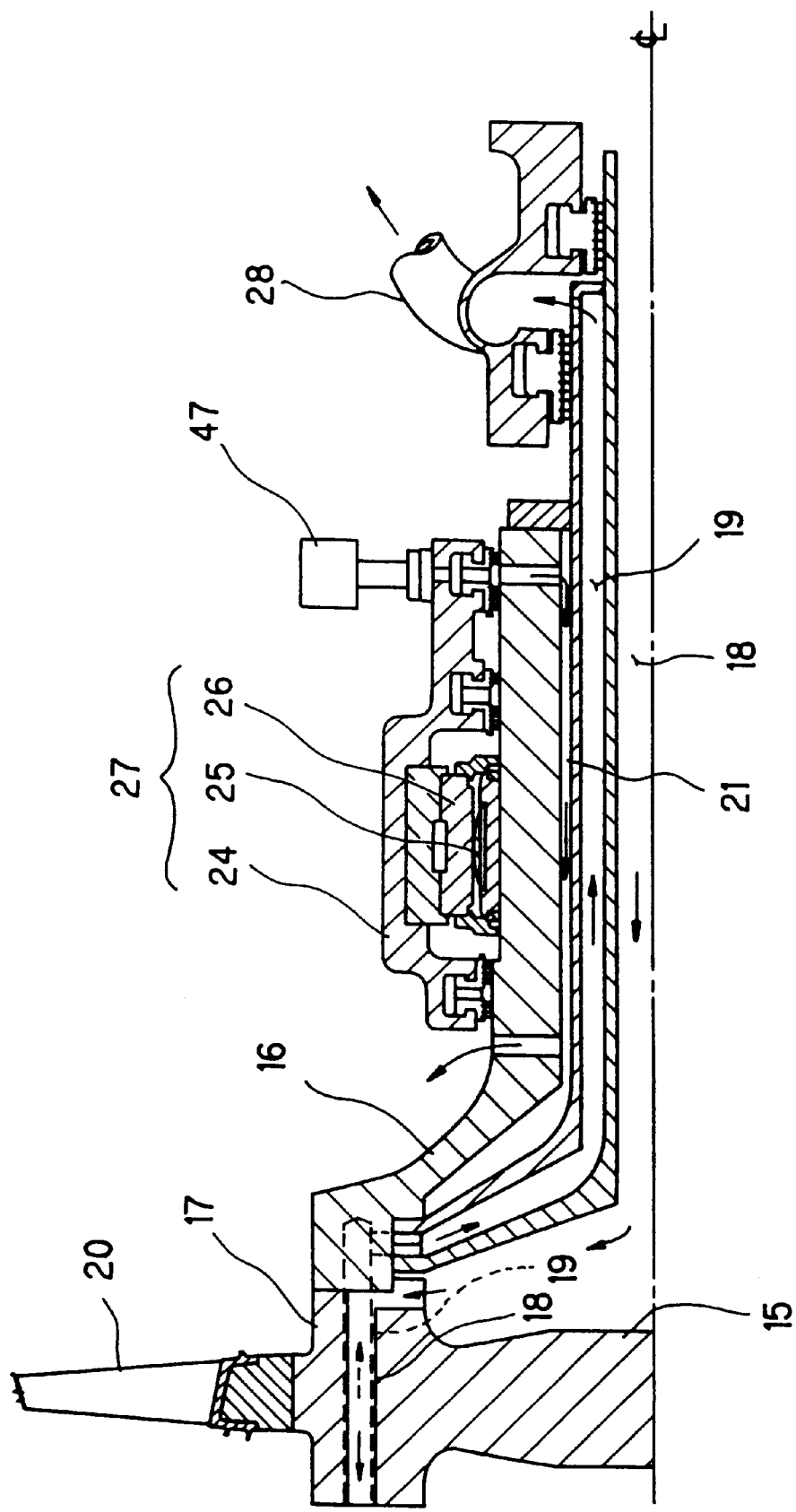
FIG. 16 a cross-sectional view schematically showing a modified example of an upper half portion of a main body of a gas turbine according to a fifth embodiment of the present invention.
Figure 17:
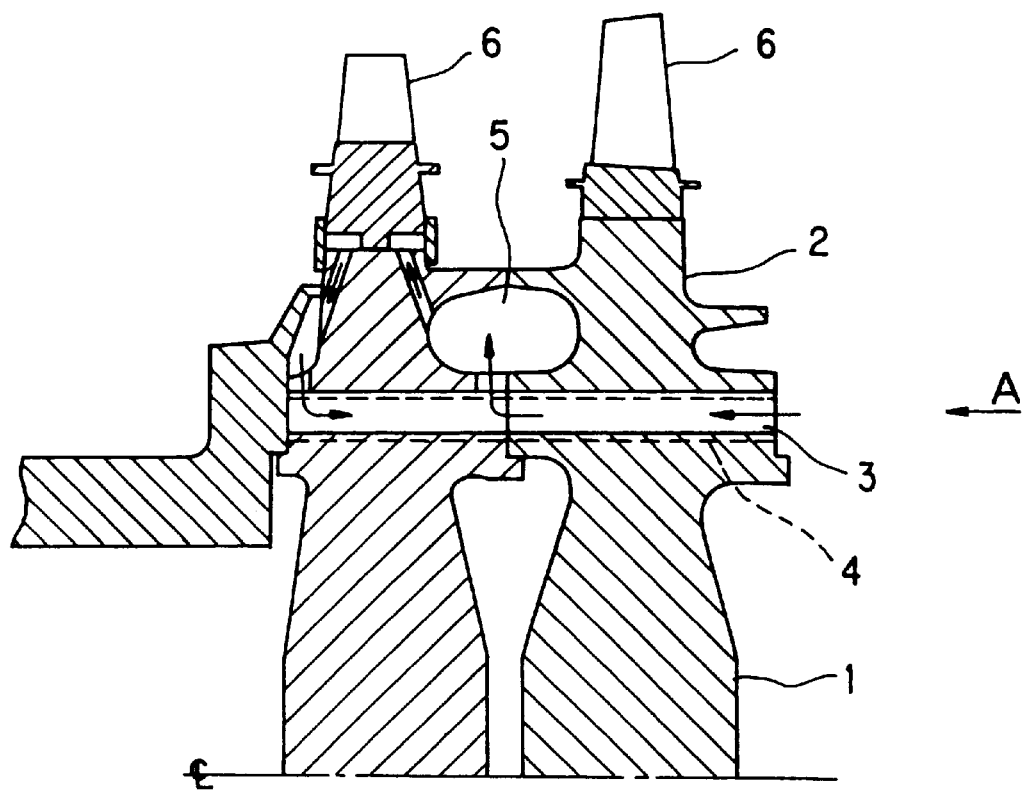
FIG. 17 is a partially cross-sectional view showing a conventional gas turbine.
Figure 18:
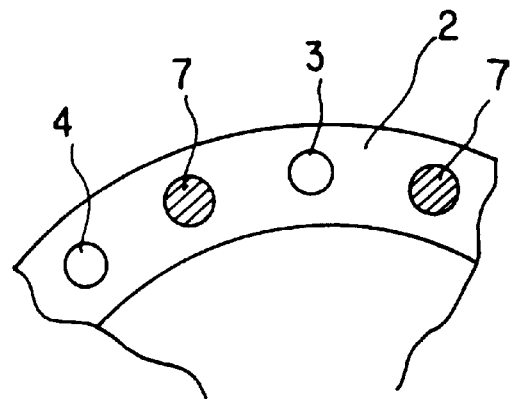
FIG. 18 is a cross-sectional and partly broken view viewed from an arrow A of FIG. 17.
Figure 19:
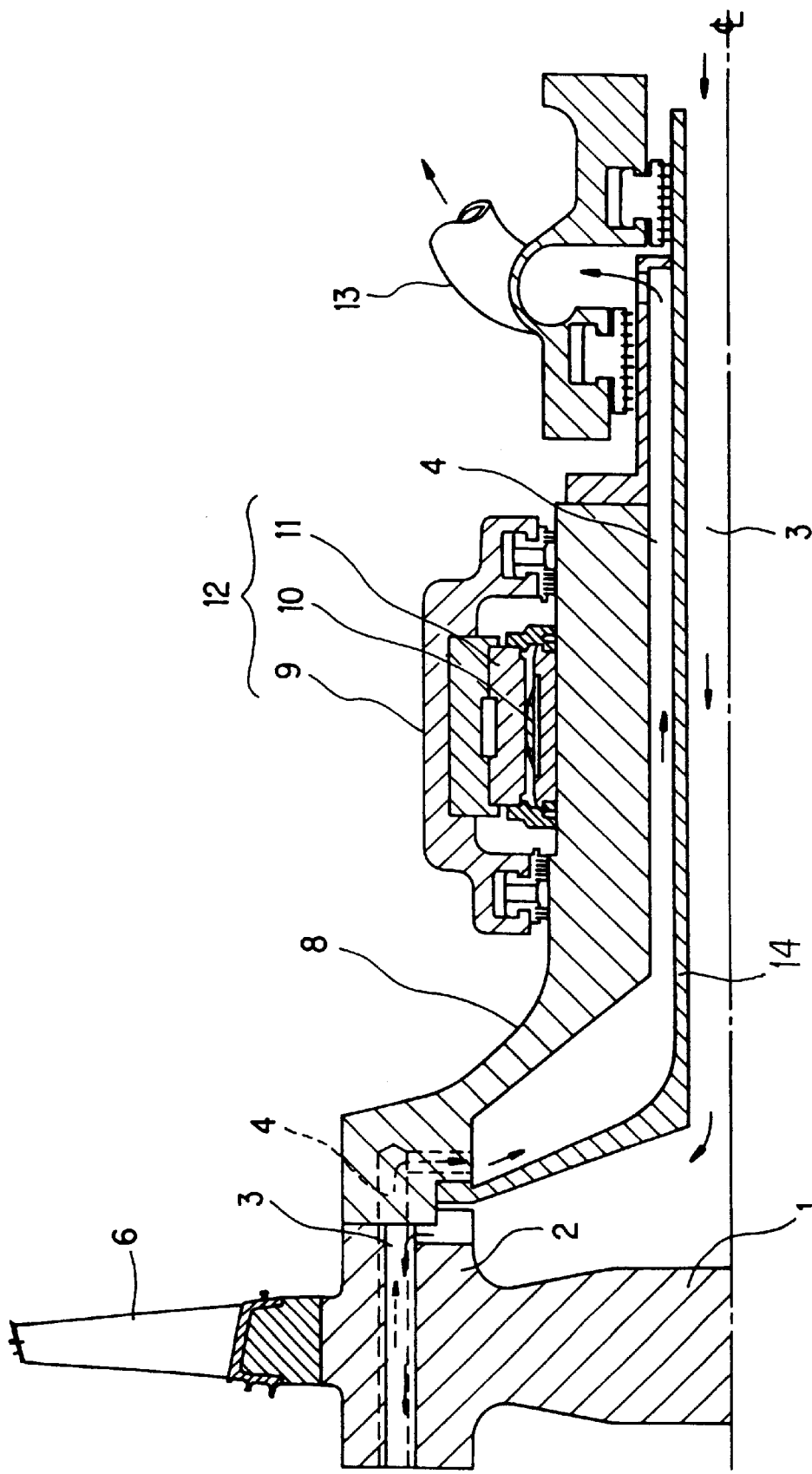
FIG. 19 a cross-sectional view schematically showing an upper half portion of a main body of a conventional gas turbine.

FIG. 16 is a cross-sectional view showing an upper half portion of a main body of a gas turbine according to a fifth embodiment of the present invention, in which like reference numerals are used to designate the same components as those of the first embodiment.

In this fifth embodiment, there is provided a pump 47 connected to the bearing housing 24 of the journal bearing 27. A cooling medium such as air is supplied from the pump 47 to the air passage 21 to forcibly cool the air passage 21, and thereafter, the cooling medium such as air is discharged from the air flow outlet 41 to the outside.

As described above, in this embodiment, the pump 47 connected to the bearing housing 24 of the journal bearing 27 is provided, and the air passage 21 is forcibly cooled by the cooling medium such as air, and thus, it is possible to shield and reduce the radiation heat of the recovery steam transmitted from the cooling steam recovery passage 19 to the rear shaft 16. Therefore, the journal bearing 27 can be securely and stably operated.

As is evident from the above description, in the gas turbine of the present invention, the cooling steam supply passage and the cooling steam recovery passage are provided in the rear shaft, and the air passage or the heat insulating portion is formed between at least one of the cooling steam supply passage and the cooling steam recovery passage and the rear shaft. Further, it is possible to shield and reduce the radiation heat of the recovery steam transmitted from the cooling steam supply passage or from the cooling steam recovery passage to the rear shaft. Accordingly, the journal bearing can be securely and stably operated, and it is also possible to sufficiently cope with the high temperature of the gas turbine.

It is to be noted that the present invention is not limited to the described embodiments and many other changes, modifications and combinations thereof may be made without departing from the scopes of the appended claims.

What is claimed is:

1. A gas turbine comprising a compressor, a combustor and a turbine body operatively connected to the compressor through a rotation shaft, said turbine body being composed of a plurality of rotors formed with turbine discs and movable blades which are arranged in plural stages along an axial direction of the turbine body, in which a rear shaft is connected to a downstream side of a final stage disc of the turbine discs so as to extent rearward from the final stage turbine disc and supported by means of a bearing, wherein said rear shaft is formed with a cooling medium supply passage for supplying a cooling medium to the gas turbine disc and a cooling medium recovery passage for recovering the cooling medium from the gas turbine disc, and wherein a labyrinth seal is provided between the gas turbine disc and the bearing, said labyrinth seal being formed with a cooling medium supply hole which communicates with the cooling medium supply passage and a cooling medium recovery hole which communicates with the cooling medium recovery passage.

2. A gas turbine comprising a compressor, a combustor and a turbine body operatively connected to the compressor through a rotation shaft, said turbine body being composed of a plurality of rotors formed with turbine discs and movable blades which are arranged in plural stages along an axial direction of the turbine main body, in which a rear shaft is connected to a downstream side of a final stage disc of the gas turbine discs so as to extend rearward from the final stage turbine disc and supported by means of a bearing, wherein said rear shaft is formed with a cooling medium supply passage for supplying a cooling medium to the turbine disc and a cooling medium recovery passage for recovering the cooling medium from the turbine disc, and wherein a labyrinth seal is provided between the gas turbine disc and the bearing, said labyrinth seal being formed with a cooling medium supply hole which communicates with the cooling medium supply passage and a cooling medium recovery hole which communicates with the cooling medium recovery passage, and a cooling medium passage is further formed in the rear shaft supported by means of the bearing.

* * * * *

UNITED STATES PATENT AND TRADEMARK OFFICE
CERTIFICATE OF CORRECTION

PATENT NO. : 6,293,089 B1
DATED : September 25, 2001
INVENTOR(S) : Sasaki

It is certified that error appears in the above-identified patent and that said Letters Patent is hereby corrected as shown below:

<u>Title page, Item 54, and Column 1,</u>
Line 1, the title should read: -- [54] GAS TURBINE HAVING LABYRINTH SEALED COOLING PASSAGES --

Signed and Sealed this

Twenty-fifth Day of June, 2002

*Attest:*

*Attesting Officer*

JAMES E. ROGAN
*Director of the United States Patent and Trademark Office*